Patented Aug. 24, 1943

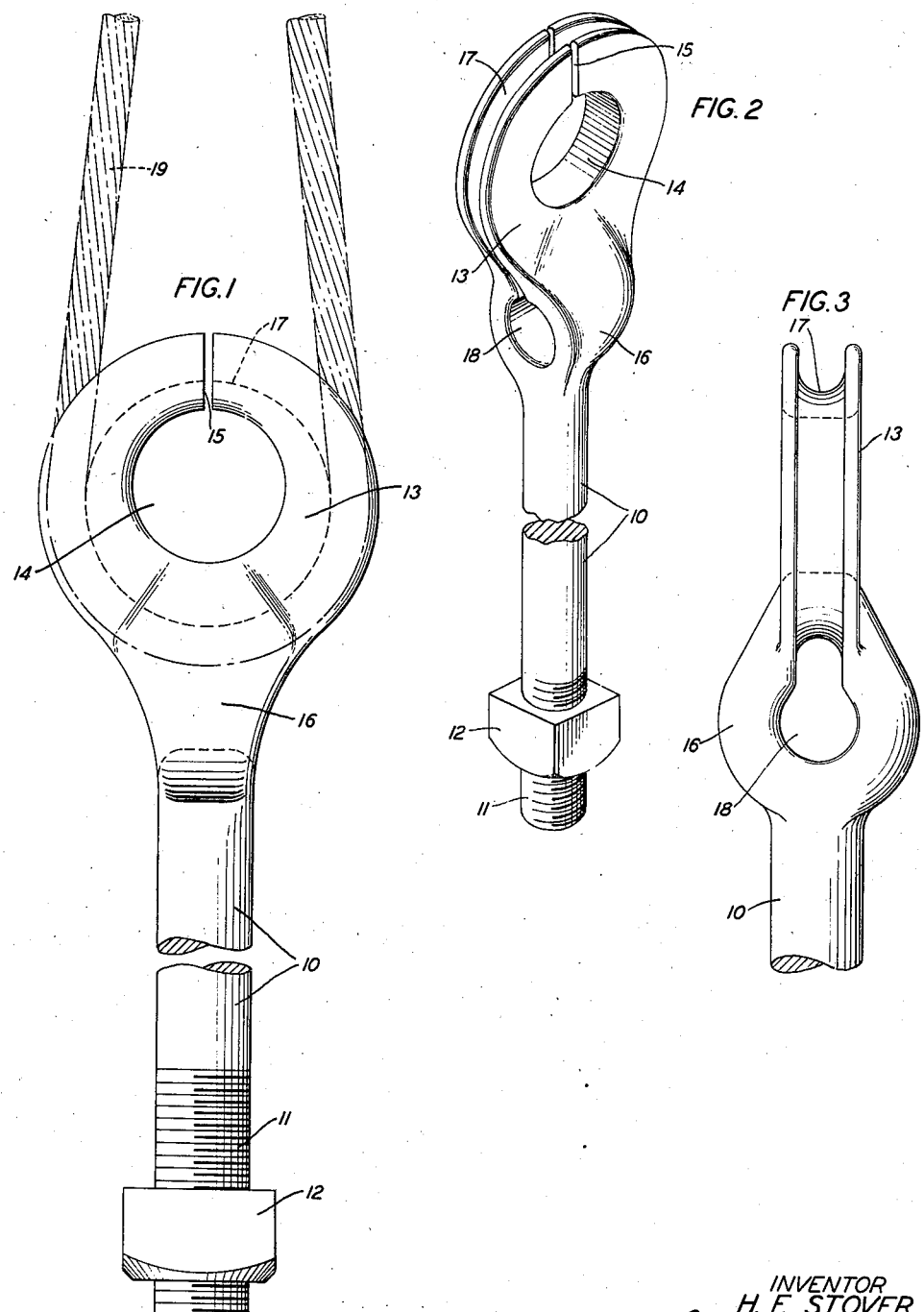

2,327,567

UNITED STATES PATENT OFFICE 2,327,567

EYE STRUCTURE FOR ANCHOR RODS

Herbert F. Stover, Brooklyn, N. Y., assignor to Bell Telephone Laboratories, Incorporated, New York, N. Y., a corporation of New York Application June 27, 1942, Serial No. 448,879

6 Claims. (Cl. 24—129)

This invention relates to anchoring devices and more particularly to improvements in the eye structure of such devices through which a guy wire or the like is looped.

The object of the present invention is the provision of an eye structure which will reduce the number of failures of the strands at the eyes of the guy rods.

In the present types of guy rods, eye bolts and the like, the eye is so constructed that the guy strand, which passes therethrough, is bent around a comparatively small radius, thereby bending the strand so sharply that the strand is weakened at that point and failure soon results.

One method of overcoming this deficiency has been to insert through the eye what is known as a thimble and positioning the guy strand in this thimble, the radius of the thimble being substantially larger than that of the eye bolt and thereby providing a larger radius of curvature for the strand at the point where it contacts the eye. However, this method necessitates an extra piece of equipment and it has been found in some instances where great strains are applied that the thimble collapses, thereby permitting the strand positioned therein to assume a sharp radius where it contacts the eye bolt. In the improved eye structure of the present invention, the advantages of a large thimble eye have been incorporated in the eye structure of the bolt thereby providing in a single unit the strenth of an eye and the larger radius of curvature of the thimble eye.

As shown in the eye structure of this invention, the eye structure is provided with a large radius of curvature without weakening the structure of the eye itself. This is accomplished by providing a suitable flat circular portion having a circumferential strand-receiving groove therein and a bulbous shank portion having a bore therein which communicates with the circumferential groove in the flat portion.

The invention will be more clearly understood from the following detailed description when read in connection with the following drawing of which:

Fig. 1 is a side elevation of an anchor rod or bolt provided with the improved eye structure of this invention;

Fig. 2 is a view in perspective of the structure shown in Fig. 1; and

Fig. 3 is a side elevation of the eye structure shown in Figs. 1 and 2.

As shown in the drawing the eye structure of this invention is illustrated as forming an integral part of an anchor rod or bolt 10, which may be of any desired length. In this instance, it is provided at its lower end with a threaded portion 11 and a nut 12 positioned thereon. In some instances the nut 12 may be dispensed with and means for securing the rod to anchors or the like may be substituted therefor. The bolt 10, may, in certain instances, be a part of other devices to which it is desired to secure a strand or a similar length of material thereto.

The upper end of the rod 10 is provided with the improved eye structure of my invention and comprises a substantially circular flat portion 13 provided with a central bore or aperture 14 and a transverse slot 15. The slot 15 provides a certain amount of give or springiness to the flat portion 13 which dampens the vibrations of the strand 19 located in the groove 17 thereby reducing to a minimum strand fatigue at the point where it contacts the eye structure. The flat portion 13 converges with the bulbous portion 16 of the shank 10 and is provided with a circumferential groove 17 on the periphery thereof which communicates with the bore 18 in the bulbous portion 16 for receiving the strand 19.

It will be observed with reference to Fig. 1 that the circumferential groove 17 is designed to provide a long continuous bearing surface for the guy strand 19, which when looped through the eye and positioned in the groove and subjected to the required tension, will be drawn into intimate contact with said groove and rest in the bottom thereof.

The circumferential groove 17 has a radius of curvature sufficiently large to reduce to a minimum the bending strain on the guy wire 19 and consequently to avoid injury thereto.

While I have shown and described the preferred form and application of my invention, it is to be understood that various changes and modifications may be made therein without departing from the spirit of the invention and are only limited by the scope of the appended claims.

What is claimed is:

1. An eye structure for anchor rods and the like comprising a substantially circular flat portion, a bulbous shank portion having a substantially triangular cross section converging therewith, a substantially continuous circumferential groove in the periphery of said flat portion and a circular bore in said shank portion communicating with said circumferential groove.

2. An eye structure for anchor rods and the like comprising a substantially circular flat portion having an aperture therein, a bulbous shank portion having a substantially triangular cross section converging with said flat portion and having a central bore therein, and a substantially continuous circumferential groove in the periphery of said flat portion communicating with said central bore.

3. An eye structure for anchor rods and the like comprising a substantially circular flat portion having an aperture therein, a bulbous shank portion having a substantially triangular cross section converging with said flat portion, and having a central bore therein at right-angles with respect to said aperture and a substantially continuous circumferential groove in the periphery of said flat portion communicating with said central bore.

4. An eye structure for anchor rods and the like comprising a substantially circular flat portion, a bulbous shank portion having a substantially triangular cross section converging therewith, a substantially continuous circumferential groove in the periphery of said flat portion and a circular bore in said bulbous portion communicating with said circumferential groove, the diameter of said circumferential groove being substantially smaller than said bore.

5. An eye structure for anchor rods and the like comprising a substantially circular flat portion having a central bore therein, and a slot in the periphery of said flat portion communicating with said central bore, a bulbous shank portion having a substantially triangular cross section converging with said flat portion and having a bore therein and a substantially continuous circumferential groove in the periphery of said flat portion communicating with said central bore, the side walls of which converge with said bulbous portion.

6. An eye structure for anchor rods and the like comprising a substantially circular flat portion having an aperture therein, and a slot in the periphery of said flat portion communicating with said aperture, a bulbous shank portion having a substantially triangular cross section, converging with said flat portion and having a central bore therein at right angles with respect to said first bore, and a substantially continuous circumferential groove in the periphery of said flat portion communicating with said central bore the side walls of which converge with said bulbous portion.

HERBERT F. STOVER.